No. 856,667. PATENTED JUNE 11, 1907.
J. C. WRIGHT.
AUTOMATIC SHUT-OFF FOR FAUCETS.
APPLICATION FILED AUG. 14, 1906.
2 SHEETS—SHEET 2.
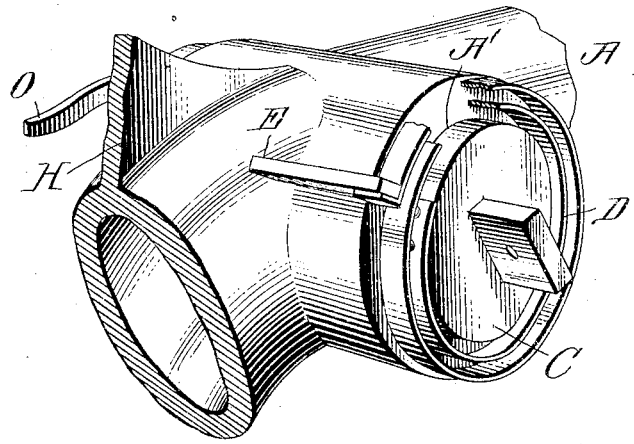
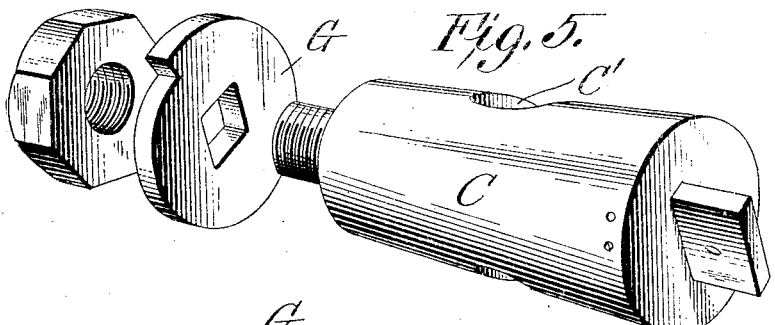
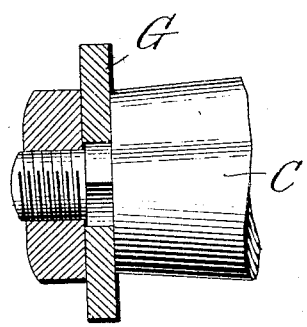
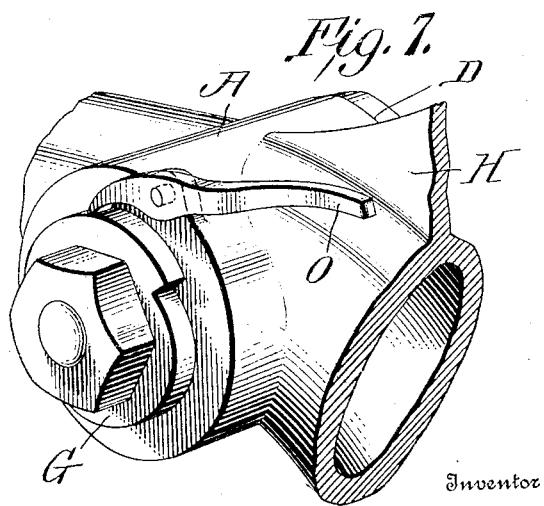
Witnesses
O. W. Holmes
Rea P. Wright
Inventor
James C. Wright
By O'Meara & Brock
Attorneys

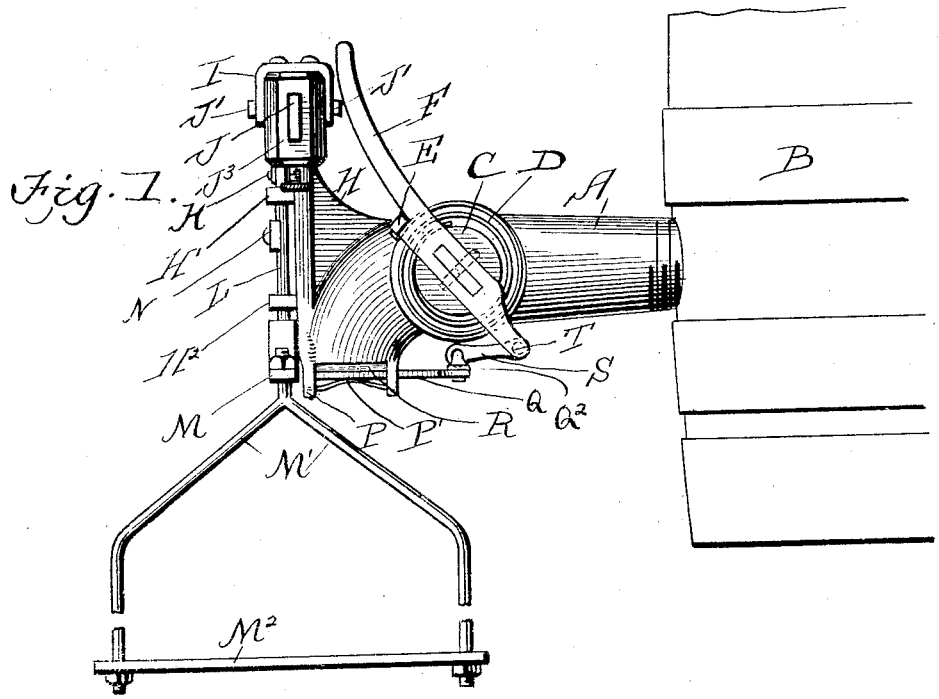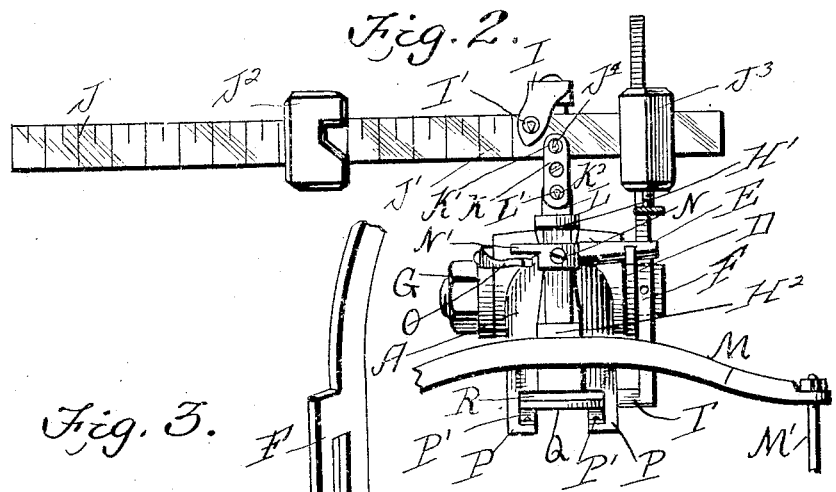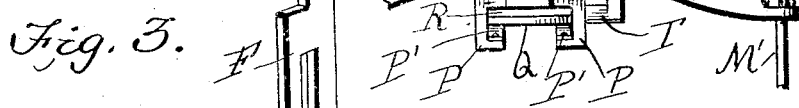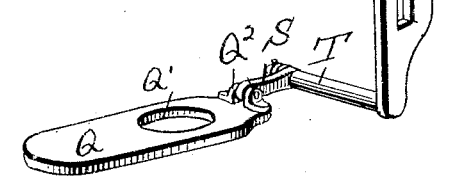

UNITED STATES PATENT OFFICE.

JAMES C. WRIGHT, OF COLORADO SPRINGS, COLORADO, ASSIGNOR OF ONE-HALF TO J. C. RAWLINGS, OF COLORADO SPRINGS, COLORADO.

AUTOMATIC SHUT-OFF FOR FAUCETS.

No. 856,667.     Specification of Letters Patent.     Patented June 11, 1907.

Application filed August 14, 1906. Serial No. 330,581.

*To all whom it may concern:*

Be it known that I, JAMES C. WRIGHT, a citizen of the United States, residing at Colorado Springs, in the county of El Paso and State of Colorado, have invented a new and useful Improvement in an Automatic Shut-Off for Faucets, of which the following is a specification.

This invention relates to certain new and useful improvements on my faucet on which application for Letters Patent was made Jan. 8, 1906, Serial Number 295,106; the object being to provide a cut off in connection with the faucet so that the mouth of the faucet will be closed at the same time that the faucet is, so that the liquid in the faucet will be locked therein thereby preventing the same from dripping on the platform.

With this and various other objects in view, the invention consists in the novel features of construction, hereinafter fully described and pointed out in the claims.

In the drawings forming a part of this specification:—Figure 1 is a side elevational view of my improved faucet. Fig. 2 is a front view of the faucet, the platform being partly broken away. Fig. 3 is a perspective view of the auxiliary slide-valve detached. Fig. 4 is a detail perspective view of the faucet showing the manner of connecting coil-springs to the turning plug. Fig. 5 is a perspective view of the turning plug, notched washer and securing nut. Fig. 6 is a detail view showing the washer secured on the end of the plug. Fig. 7 is a perspective view of the faucet showing the pawl and washer arranged thereon.

Referring to the drawing A indicates the faucet proper, having a threaded end adapted to be screwed into the barrel B. The faucet is provided with a transverse opening A' in which a turning plug C having a passage C' is mounted. The end of the coil-spring D is secured on one end of the plug C, having an angled free end adapted to bear against the bar E, secured to the faucet and normally hold the turning plug in a closed position, the bar E also forms a stop for a handle F mounted on the end of the plug. The other end of the plug C is provided with a reduced threaded portion on which a notched washer G is secured by a nut.

The outer end of the faucet proper is provided with an upwardly projecting portion H having a reduced upper end to which is secured a yoke I, provided with openings I', in which the knife edge lugs J', of a scale beam J, are mounted. The beam is provided with a weight $J^2$, and a counter-balance weight $J^3$. Knife edge lugs $J^4$, are formed on the bar J over which the opening K' of a link K, is secured which is provided with openings $K^2$, adapted to fit over the knife-edge lugs L' of the bar L working in apertured lugs H', $H^2$, of the portion H. A cross bar M is secured to the lower end of the bar L provided with bars M' carrying a platform $M^2$. A sleeve N is secured on the bar L provided with an outwardly projecting arm N' adapted to engage a pawl O pivoted to the side of the faucet, which is held into engagement with the notched washer of the plug by a spring.

The mouth of the faucet is provided with downwardly projecting angled lugs P on which are secured bowed springs P', on which is mounted a slide valve Q which is adapted to be held up tightly against a rubber ring R, secured around the mouth by the bowed springs P'. An opening Q', is formed in the valve Q adapted to register with the mouth when the faucet is opened. Apertured ears $Q^2$ are secured to the end of the valve Q between which a link S is mounted on a pin, the other end of the link being pivotally mounted on the reduced end of a bar T carried by the handle F, so that the mouth of the faucet will be opened and closed as the faucet is opened and closed.

The operation is as follows: The vessel to receive the liquid is placed on the platform and the weight adjusted on the beam to the amount desired. The handle is then turned until the notch of the washer carried by the plug is engaged by the pawl which will lock the opening in the plug in alinement with the faucet, and the opening in the slide valve with the mouth of the faucet, so as to allow liquid to pass out until the required amount has been received in the vessel, which will trip the pawl and the spring surrounding the plug will close the same and at the same time the slide-valve will be forced over the mouth of the faucet and close the same, thus preventing the liquid in the faucet from dripping on the platform.

Having thus fully described my invention, what I claim as new and desire to secure by Letters Patent is:—

1. The combination with a faucet provided with a spring actuated turning plug, of a weighing scale carried by said faucet, a slide valve connected to said plug and tripping means pivoted to the faucet adapted to be engaged by the scale, for the purpose described.

2. The combination with a faucet provided with a spring actuated turning plug carrying a notched washer, of a weighing scale carried by said faucet, a slide-valve connected to said plug working over the mouth of the faucet, and a pawl held into engagement with the notched washer adapted to be engaged by the scale, for the purpose described.

3. The combination with a faucet provided with a spring-actuated turning plug, of a weighing scale carried by said faucet, a spring actuated slide valve working over the mouth of the faucet connected to said plug and tripping means pivoted to the faucet adapted to be engaged by the scale, for the purpose described.

4. The combination with a faucet provided with a spring actuated turning plug provided with a handle, of a weighing scale carried by said faucet, a slide valve mounted over the mouth of the faucet, connected to said handle, and tripping means pivoted to the faucet adapted to be engaged by the scale, for the purpose described.

5. The combination with a faucet provided with a plug carrying a handle, of a weighing scale carried by said faucet, a spring surrounding one end of said plug bearing against said handle, angle lugs projecting downwardly from the mouth of the faucet carrying bowed springs, a slide-valve mounted on said spring connected to the handle, and tripping means pivoted to the faucet adapted to be engaged by the scale, for the purpose described.

6. The combination with a faucet provided with a spring actuated turning plug carrying a handle, of a weighing scale carried by said faucet, lugs projecting downwardly from the mouth of said faucet carrying bowed springs, a slide-valve mounted on said springs connected to the handle by a link, and tripping means pivoted to the faucet adapted to be engaged by the scale, for the purpose described.

7. The combination with a faucet provided with a spring actuated turning plug, of a weighing scale carried by said faucet, angled lugs projecting downwardly from the mouth of the faucet carrying bowed springs, a slide valve mounted on said spring provided with an opening, a handle carried by the plug provided with a bar, a link connecting said bar to said slide valve and tripping means pivoted to the faucet adapted to be engaged by the scale, for the purpose described.

8. The combination with a faucet provided with a spring actuated turning plug carrying a notched washer, of a handle secured to the other end of said plug, a washer secured over the mouth of the faucet, lugs projecting downwardly from the mouth of the faucet carrying bowed springs, a slide valve, mounted on said springs connected to said handle, and a pawl held into engagement with said washer adapted to be engaged by the scale, for the purpose described.

JAMES C. WRIGHT.

Witnesses:
J. A. GROVER,
F. T. BUSHNELL.